US009592528B2

(12) United States Patent
Lawrence et al.

(10) Patent No.: US 9,592,528 B2
(45) Date of Patent: Mar. 14, 2017

(54) EXTRUDING MACHINE

(71) Applicant: DELPHI TECHNOLOGIES, INC., Troy, MI (US)

(72) Inventors: Bruce D. Lawrence, Cortland, OH (US); William J. Stinellis, Niles, OH (US); David E. McClelland, Cortland, OH (US); Steve Kalan, Akron, OH (US); Leonard J. Turco, Hermitage, PA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/693,335

(22) Filed: Apr. 22, 2015

(65) Prior Publication Data
US 2016/0310987 A1    Oct. 27, 2016

(51) Int. Cl.
*B05C 11/00* (2006.01)
*B05C 3/02* (2006.01)
(Continued)

(52) U.S. Cl.
CPC .......... *B05D 1/265* (2013.01); *B05C 3/12* (2013.01); *B05C 11/1005* (2013.01);
(Continued)

(58) Field of Classification Search
USPC ............ 118/410, 419, 405, 712, 665, 325; 425/113, 133.1, 141, 150, 381, 466
See application file for complete search history.

(56) References Cited

U.S. PATENT DOCUMENTS

| | | | |
|---|---|---|---|
| 3,923,439 A | * | 12/1975 | Isley .................. B29C 47/28 425/150 |
| 4,068,615 A | | 1/1978 | Lenir |

(Continued)

FOREIGN PATENT DOCUMENTS

| | | |
|---|---|---|
| CA | 2065075 C | 1/2002 |
| DE | 3903916 A1 | 8/1990 |
| EP | 635851 A2 | 3/1997 |
| GB | 2211319 A | 6/1989 |
| JP | 07320572 | 12/1995 |
| JP | 10249919 A | 9/1998 |
| JP | 2004042496 A | 2/2004 |

OTHER PUBLICATIONS

Feedforward, Hot and Cold Control System for Controlling Plastic Insulation Thickness in Manufacturing of Cable Products, Hisham Hussein, King Fand University of Petroleum and Minerals, Sep. 12, 2013.

(Continued)

*Primary Examiner* — Yewebdar Tadesse
(74) *Attorney, Agent, or Firm* — Robert J. Myers

(57) ABSTRACT

An apparatus, such as an extruding machine, configured to form a sheath, e.g. insulative layer, over an elongate member, e.g. a wire cable including an extruder to apply the material forming the sheath, a drive mechanism configured to move the elongate member through the extruder at a line speed, a thickness sensor to determine the thickness of the material, and a controller. The controller is programmed to determine a deviation between the actual material thickness a desired thickness, determine a correction factor value based on the deviation between the actual thickness and the desired thickness of the material applied, and adjust the line speed, via the drive mechanism, based on the line speed, an extruder feeder speed, the correction factor value and a material factor value that is based on rheological properties of the material. A method of operating such an extruding machine is also presented.

5 Claims, 3 Drawing Sheets

(51) Int. Cl.
*B05D 1/26* (2006.01)
*H01B 19/00* (2006.01)
*B05C 3/12* (2006.01)
*B05C 11/10* (2006.01)
*B29C 47/02* (2006.01)
*B29C 47/92* (2006.01)
*H01B 13/14* (2006.01)
*B29L 31/34* (2006.01)
*B29C 47/00* (2006.01)

(52) U.S. Cl.
CPC ............ *B29C 47/025* (2013.01); *B29C 47/92* (2013.01); *H01B 13/146* (2013.01); *H01B 19/00* (2013.01); B05D 2202/00 (2013.01); B05D 2256/00 (2013.01); B29C 47/0016 (2013.01); B29C 2947/926 (2013.01); B29C 2947/9258 (2013.01); B29C 2947/92123 (2013.01); B29C 2947/92152 (2013.01); B29C 2947/92447 (2013.01); B29C 2947/92619 (2013.01); B29C 2947/92647 (2013.01); B29C 2947/92857 (2013.01); B29L 2031/3462 (2013.01)

(56) References Cited

U.S. PATENT DOCUMENTS

| | | | | |
|---|---|---|---|---|
| 4,448,736 | A | * 5/1984 | Emery | ............... B29C 47/92 264/211 |
| 4,585,603 | A | 4/1986 | Furuta et al. | |
| 4,641,525 | A | 2/1987 | Merki | |
| 5,149,193 | A | * 9/1992 | Faillace | ............... B29C 47/82 264/349 |
| 8,074,596 | B2 | 12/2011 | Knoch et al. | |
| 2003/0211189 | A1* | 11/2003 | Eiva | ............... B29C 47/827 425/143 |
| 2010/0052199 | A1 | 3/2010 | Sikora et al. | |

OTHER PUBLICATIONS

Modified Smith predictor for extruded diameter control, Lorcan Smith, Computing & Control Engineering Journal, Apr. 1999.
"Cellmaster" http://www.mejicoro.com/mejicoro/upload/1291f3dd787d0745069ceae228dc3da5bff45aaa.pdf, Anonymous, Mar. 1, 2008.

* cited by examiner

EXTRUDING MACHINE

TECHNICAL FIELD OF THE INVENTION

The invention relates to an extruding machine configured to apply a sheath of material, such as a layer of insulation, about an elongate member, such as a wire electrical cable, and a method of controlling such a machine.

BACKGROUND OF THE INVENTION

Wire electrical cables are usually made in the form that their conductor (core) is drawn through an extruder, which applies an insulative sheath onto the conductor which consists of a suitable plastic material. After the extrusion, the wire cable or the extrudate is guided through a cooling path, a vulcanization path, or a dry crosslinking path. The sheath must have a minimum wall thickness, for reasons of insulation safety for instance. On the other hand, making the wall thickness too thick without necessity is undesirable, for reasons of materials saving or weight. It is therefore desirable to monitor the wall thickness or the diameter of a cable or extrudate, and to provide measures which perform a correction to the thickness when the preset thickness values are exceeded or fallen below.

It is also known to measure the wall thickness of the sheath. When a sheath is mentioned in the following, a single-layer sheath is to be understood for the sake of simplicity. Of course, the insulation of a cable can also consist of multiple layers, which are formed by co-extrusion or by means of several extruders arranged one after the other.

An X-ray measuring device may be suitable for measuring the wall thickness, by way of which it is possible to determine the thickness of the individual layers of a sheath and the diameter of the core. However, it is also possible to determine the thickness of a layer of a sheath by measuring the diameter only, provided that at the same time, the diameter of the core can be assumed to be known or is measured before entering the extruder.

For a given core diameter; the wall thickness of the sheathing depends on the output capacity of an extruder and on the so-called line speed. The output capacity depends primarily on the rotational speed of the feeder screw of the extruder. The line speed is preset by the drive mechanisms which haul the wire cable from a supply drum and draw the wire cable through the extruder and the cooling path to a take-up reel.

As already mentioned, it is known to provide a wall thickness adjustment by measuring the actual value for the wall thickness after the cooling path, with an X-ray device for instance, and comparing the actual value with a preset desired value for the wall thickness. A PI controller outputs a corresponding correcting variable to the extruder, for changing the rotational speed of the screw thereof, for instance. Through this, its output volume is changed also, and consequently the wall thickness of the sheathing. During the start-up phase of the process of applying the insulative sheath, existing extruding machines ramp the line speed up to a preset speed while the feeder screw speed of the extruder follows by a fixed ratio. This empirical method causes various amounts of scrap based on how close the original ratio is to the actual ratio required to produce the specified diameter.

As cooling paths can have a great length, hundred meters and more for instance, such a regulation is slow, of course, in particular when cables with large diameter of the sheathing are produced, which are extruded with line speeds of 10 to 100 meters per minute for instance, at maximum output capacity of the extruder.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, method of operating an apparatus configured to form a sheath over an elongate member is provided. The method includes the step of providing an extruder configured to apply a material to form the sheath. The extruder further includes a feeder operating at a feeder speed to supply the material to the extruder. The method also includes the step of providing a drive mechanism configured to move the elongate member through the extruder at a line speed to apply the material to the elongate member thus forming the sheath. The sheath has a thickness. The method further includes the steps of providing a thickness sensor configured to determine the thickness of the sheath, providing a controller comprising a central processing unit, a memory, and a transceiver that communicates with the feeder, the extruder, and the thickness sensor, and storing a material factor value in the memory, wherein the material factor value is based on rheological properties of the material. The method additionally includes the steps of determining, via the central processing unit, a deviation between thickness data from the thickness sensor and a desired thickness value stored in the memory, determining, via the central processing unit, a correction factor value based on the deviation between the thickness data and the desired thickness value, and adjusting the line speed, via the controller and the drive mechanism, based on line speed data, feeder speed data, the material factor value, and the correction factor value.

The correction factor value may be variable. In this case, the method further includes the step of revising the correction factor value based on subsequent comparison of the thickness data and the desired thickness value. The material factor value may be constant.

The sheath may be formed of an electrically insulative material, for example a polymeric material. The elongate member may be formed of an electrically conductive wire cable.

The method may additionally include the steps of providing a line speed sensor in communication with the transceiver and configured to determine the line speed data and/or providing a feeder speed sensor in communication with the transceiver and configured to determine the feeder speed data.

In accordance with another embodiment, an apparatus for forming a sheath over an elongate member is provided. The apparatus includes an extruder configured to apply a material to form the sheath. The extruder further comprising a feeder operating at a feeder speed to supply the material to the extruder. The apparatus also includes a drive mechanism configured to move the elongate member through the extruder at a line speed to apply the material to the elongate member thus forming the sheath. The sheath has a thickness. The apparatus further includes a thickness sensor configured to determine the thickness of the material applied to the elongate member and a controller comprising a central processing unit, a memory, and a transceiver that communicates with the feeder, the extruder, and the thickness sensor and receives feeder speed data from the extruder, line speed data from the drive mechanism, and thickness data from the thickness sensor. The central processing unit is programmed to determine a deviation between the thickness data from the thickness sensor and a desired thickness value stored in the memory, determine a correction factor value based on the deviation between the thickness data and the desired thickness value, and adjust the line speed, via the drive mechanism, based on the line speed data, the feeder speed data, a material factor value stored in the memory that is based on rheological properties of the material, and the correction factor value.

The correction factor value may be variable and, in this case, the central processing unit is further programmed to revise the correction factor value based on subsequent comparison of the thickness data and the desired thickness value.

The apparatus may further include a line speed sensor in communication with the transceiver and configured to determine the line speed data and/or a feeder speed sensor in communication with the transceiver and configured to determine the feeder speed data.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Presented herein is an apparatus configured to apply or extrude a sheath, such as a layer of insulative material, over an elongate member, such as a wire electrical cable. Hereinafter this apparatus will be referred to as an extruding machine. The extruding machine includes a controller that is programmed so that the extruding machine applies the layer of material with a consistent thickness and the variation in thickness is minimized during the start-up period of the apparatus, thus minimizing the amount of scrap material produced during start-up. A method of operating such an extruding machine is also presented.

Figure 1:
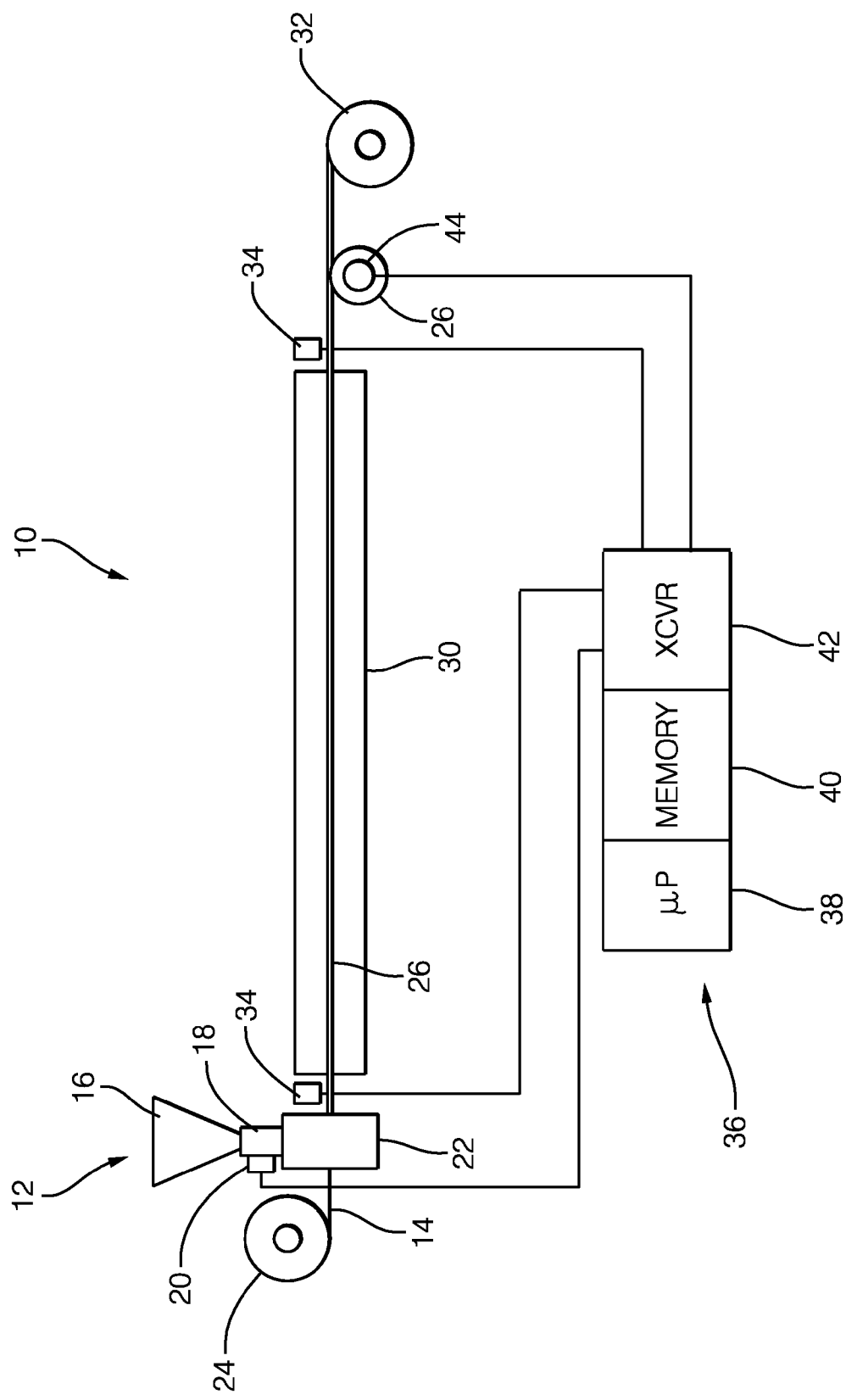
FIG. 1 is a schematic diagram of an apparatus for forming a sheath over an elongate member according to one embodiment.

FIG. 1 illustrates an non-limiting example of an extruding machine 10. The extruding machine 10 includes an extruder 12 that is configured to apply a material, in this example an insulative polymeric material to form a sheath over an elongate member, in this example a wire electrical cable 14, to form an insulative layer over the wire cable 14. The wire cable 14 may be made of a single strand of wire or may include multiple wire stands. The extruder 12 includes a hopper 16 in which the material is stored. The material is drawn from the hopper 16 by a feeder 18, in this example a screw feeder (not shown). The speed at which a screw motor 20 turns the screw feeder determines the amount of material fed to the extruder 12. The material in the hopper 16 may consists of solid pellets and the feeder 18 may include a heater (not shown) that melts the solid pellets into a liquid state. The pressure within the feeder 18 caused by the screw feeder may also melt the material. The extruder 12 also includes a die 22 into which the liquefied material is fed by the feeder 18. The wire cable 14 is pulled from a supply reel 24 and though an aperture (not shown) in the die 22, thus forming a sheath 26 or insulation layer 26 on the outside of the wire cable 14 with the material. The wire cable 14 is moved through the die 22 by a drive mechanism 28. In this example, the drive mechanism 28 is a capstan around which the wire cable 14 is wound and pulls the wire cable 14 through the die 22 at a line speed. The line speed of the wire cable 14 though the die 22 determines the thickness of the sheath 26 coating the wire cable 14. The wire cable 14 an applied sheath 28 is then drawn though a cooling trough 30 to at least partially harden the material of the sheath 26 applied to the wire cable 14 to form the insulation layer 26 over the wire cable 14. The wire cable 14 with the insulation layer 26 is then wound around a take-up drum 32. The construction of extruders and drive mechanisms for extruding machines are well known to those skilled in the art.

The extruding machine 10 also includes a thickness sensor 34 that is configured to determine the thickness of the material applied to the wire cable 14. The thickness sensor 34 preferably using noncontact sensing techniques, such as X-ray or laser scanning to determine the material thickness. The thickness sensor 34 may be located just downstream from the die 22 to measure the thickness of the material as applied or may be located downstream from the cooling bath to measure the final thickness of the material. The extruding machine 10 may include multiple thickness sensors 34 located at various points downstream from the die 22. The construction and placement of thickness sensors for extruding machines are well known to those skilled in the art.

The extruding machine 10 further has a controller 36 that includes a central processing unit 38 that may be a microprocessor, application specific integrated circuit (ASIC), or built from discrete logic and timing circuits (not shown). Software instructions that program the controller 36 to control the extruding machine 10 may be stored in a non-volatile (NV) memory device 40. The NV memory device 40 may be contained within the microprocessor or ASIC or it may be a separate device. Non-limiting examples of the types of NV memory that may be used include electrically erasable programmable read only memory (EEPROM), masked read only memory (ROM), and flash memory. The controller 36 may also include a transceiver 42, such as a controller area network (CAN) transceiver, to allow the controller 36 to establish electrical communication with the feeder 18, the extruder 12, and the thickness sensor 34.

The extruding machine 10 further includes a line speed sensor (not shown) and a feeder speed sensor (not shown). The line speed sensor is configured to determine the line speed data and is in communication with the transceiver 42. The line speed sensor may preferably be incorporated into a drive motor 44 turning the capstan of the drive mechanism 28. The feeder speed sensor is configured to determine the feeder speed data and is also in communication with the transceiver 42. The feeder speed sensor is preferably incorporated into the screw motor 20. The transceiver 42 is configured to receive feeder speed data from the feeder speed sensor, line speed data from the line speed sensor, and thickness data from the thickness sensor 34. The construction and operation of feeder speed sensors and line speed sensors for extruding machines are well known to those skilled in the art.

The memory 40 of the controller 36 contains instruction that, when executed, cause the central processing unit 38 to determine a deviation between the thickness data from the thickness sensor 34 and a desired thickness value stored in the memory 40, determine a correction factor value based on the deviation between the thickness data and the desired thickness value, and adjust the line speed, via the drive mechanism 28, based on the line speed data, the feeder speed data, the correction factor value, and a material factor value. The material factor value is based on rheological properties of the material and is stored in the memory 40.

The desired line speed is determined by the formula: Ls=Cf×Mf×Ss, where Ls is desired line speed, Fs is the feeder speed, Mf is the material factor value, and Cf is the correction factor value. The value of the material factor is determined based on the volume of material required per unit length of product. The material factor is dependent on the rheological properties for the material and the extruder 12 including material temperature and viscosity, feeder geometry and speed, and flow characteristic of the die 22. The value of the material factor may also be determined experimentally. The value of the material factor is generally constant, but could change due to changes in material viscosity, material temperature, etc. The value of the correction factor may be determined, i.e. calculated, by comparing the actual line speed data to the desired line speed data and adjusting the value of the correction factor so that the difference between the actual line speed and the desired line speed is zero. The correction factor accounts for minor variations in processing conditions e.g. variations in material properties from one material lot to another lot, feed screw wear, and shrinkage compensation. The value of the correction factor will remain in a predetermined range. In a preferred embodiment, this range is 1±0.5. If the value of the correction factor deviates from this predetermined range, it may be an indication that process parameters have shifted, e.g. material viscosity or excessive wear of the feeder screw.

Figure 2:
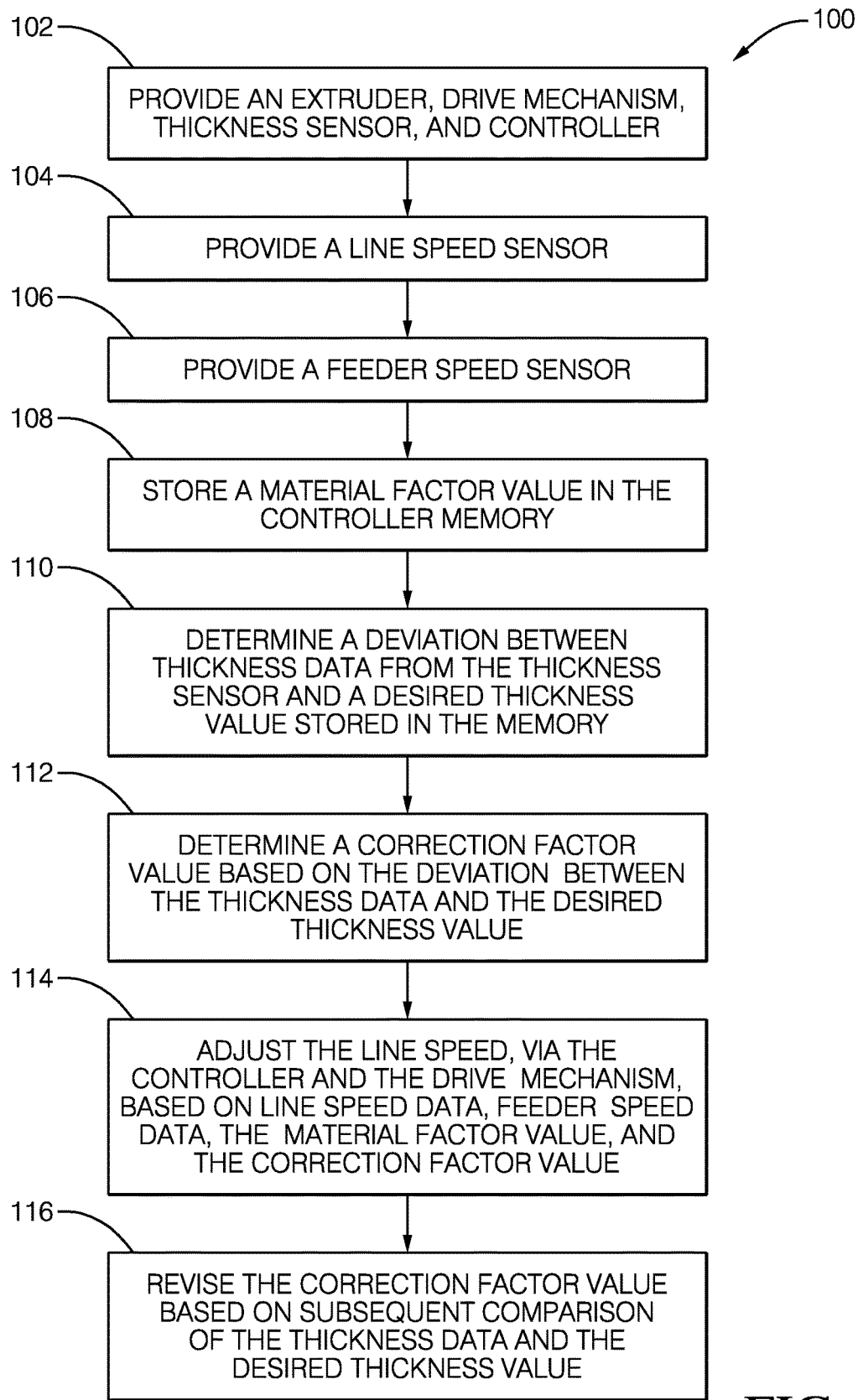
FIG. 2 is a flow chart of a method of operating an apparatus configured to form a sheath over an elongate member according to another embodiment.

FIG. 2 illustrates a non-limiting example of a method 100 of operating an apparatus 10, such as the extruding machine 10, that is configured to form a sheath 26, e.g. an insulation layer 26, over an elongate member, e.g. a wire cable 14. The method 100 include the following steps.

STEP 102, PROVIDE AN EXTRUDER, DRIVE MECHANISM, THICKNESS SENSOR, AND CONTROLLER, includes providing an extruder 12 configured to apply a material over the wire cable 14 (or other elongate member) to form the insulation layer 26 (or sheath 26).

The material is formed of an electrically insulative material, preferably a polymeric material. The elongate member may be formed of a conductive material, such as in a wire cable 14. The extruder 12 further includes a feeder 18 that operates at a feeder speed and is configured to supply the material to the extruder 12. STEP 102 also includes providing a drive mechanism 28 that is configured to move the wire cable 14 through a die 22 in the extruder 12 at a line speed to apply the material to the wire cable 14 thus forming the insulation layer 26. The insulation layer 26 has a thickness. STEP 102 further includes providing a thickness sensor 34 configured to determine the thickness of the insulation layer 26 and providing a controller 36 comprising a central processing unit 38, a memory 40, and a transceiver 42 that communicates with the feeder 18, the extruder 12, and the thickness sensor 34.

STEP 104, PROVIDE A LINE SPEED SENSOR, is an optional step that includes providing a line speed sensor in communication with the transceiver 42 and configured to determine the actual line speed data.

STEP 106, PROVIDE A FEEDER SPEED SENSOR, is an optional step that includes providing a feeder speed sensor in communication with the transceiver 42 and configured to determine the feeder speed data.

STEP 108, STORE A MATERIAL FACTOR VALUE IN THE CONTROLLER MEMORY, includes storing a material factor value in the memory 40. The material factor value is based on rheological properties of the material. According to a preferred embodiment of the method 100, the material factor value is constant. In alternative embodiments, the material factor may be a variable dependent on changes in material viscosity.

STEP 110, DETERMINE A DEVIATION BETWEEN THICKNESS DATA FROM THE THICKNESS SENSOR AND A DESIRED THICKNESS VALUE STORED IN THE MEMORY, includes determining, via the central processing unit 38, a deviation between thickness data from the thickness sensor 34 and a desired thickness value stored in the memory 40.

STEP 112, DETERMINE A CORRECTION FACTOR VALUE BASED ON THE DEVIATION BETWEEN THE THICKNESS DATA AND THE DESIRED THICKNESS VALUE, includes determining, via the central processing unit 38, a correction factor value based on the deviation between the thickness data and the desired thickness value.

STEP 114, ADJUST THE LINE SPEED, VIA THE CONTROLLER AND THE DRIVE MECHANISM, BASED ON LINE SPEED DATA, FEEDER SPEED DATA, THE MATERIAL FACTOR VALUE, AND THE CORRECTION FACTOR VALUE, includes adjusting the desired line speed, via the controller 36 and the drive mechanism 28, based on actual line speed data, feeder speed data, the material factor value, and the correction factor value. In a preferred embodiment of the method 100, the correction factor value is within a range of 1±0.5 during execution of the method 100. Excessive feeder wear may be indicated when the correction factor value is outside the range of 1±0.5.

STEP 116, REVISE THE CORRECTION FACTOR VALUE BASED ON SUBSEQUENT COMPARISON OF THE THICKNESS DATA AND THE DESIRED THICKNESS VALUE, includes revising the correction factor value based on subsequent comparison of new thickness data and the desired thickness value stored in memory 40 as the method 100 progresses, wherein the correction factor value is variable.

Figure 3:
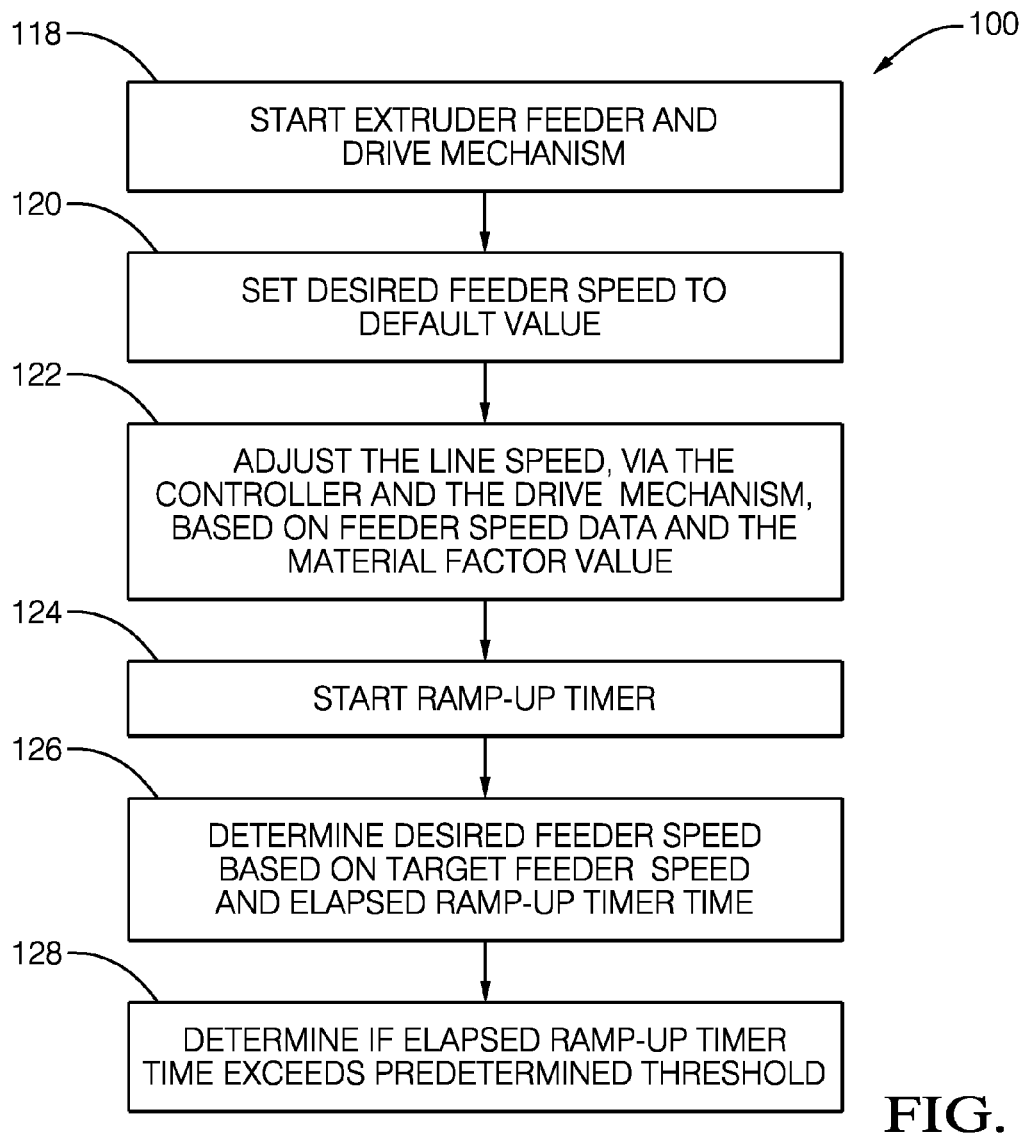
FIG. 3 is a flow chart of additional steps of the method of FIG. 2 for operating the apparatus during a start-up phase according to another embodiment.

FIG. 3 illustrates additional optional steps of the method 100 during a start-up phase that includes a feeder speed and line speed ramp-up period, i.e. the time period between the moment the apparatus is initially turned on and a later moment when the feeder speed and the line speed are at the desired values. The following STEPS 118-128, if executed, occur subsequent to STEP 108.

STEP 118, START EXTRUDER FEEDER AND DRIVE MECHANISM, includes starting the feeder 18 and the drive mechanism 28 from a stopped state.

STEP 120, SET DESIRED FEEDER SPEED TO DEFAULT VALUE, includes adjusting the feeder speed, via the controller 36 and the feeder to a default startup feeder speed that is stored in the memory 40.

STEP 122, ADJUST THE LINE SPEED, VIA THE CONTROLLER AND THE DRIVE MECHANISM, BASED ON FEEDER SPEED DATA AND THE MATERIAL FACTOR VALUE, includes adjusting the desired line speed, via the controller 36 and the drive mechanism 28, based on feeder speed data and the material factor value. During this start-up phase, the desired line speed is not based actual line speed data or the correction factor.

STEP 124, START A RAMP-UP TIMER, includes starting a ramp-up timer, via the central processing unit 38 that times the progression of the start-up phase.

STEP 126, DETERMINE DESIRED FEEDER SPEED BASED ON TARGET FEEDER SPEED AND ELAPSED RAMP-UP TIMER TIME, includes determining the desired feeder speed based on the target feeder speed at which the feeder operates during steady state operation, the elapsed ramp-up timer time, and the total time for the ramp-up phase (ramp-up period time). The desired feeder speed may be determined by the formula: $DFs=TFs \times (Et/RUt)$ where DFs is the desired feeder speed, TFs is the target feeder speed, Et is the elapsed ramp-up timer time, and RUt is the ramp-up period time. STEP 126 follows STEP 124.

STEP 128, DETERMINE IF ELAPSED RAMP-UP TIMER TIME EXCEEDS PREDETERMINED THRESHOLD, includes determining if the elapsed ramp-up timer time exceeds a predetermined threshold that is equal to the ramp-up period time. If the elapsed ramp-up timer time does not exceed the ramp-up period time, the method returns to STEP 124. If the elapsed ramp-up timer time exceeds the ramp-up period time, the proceeds to STEP 110.

Figure 4:
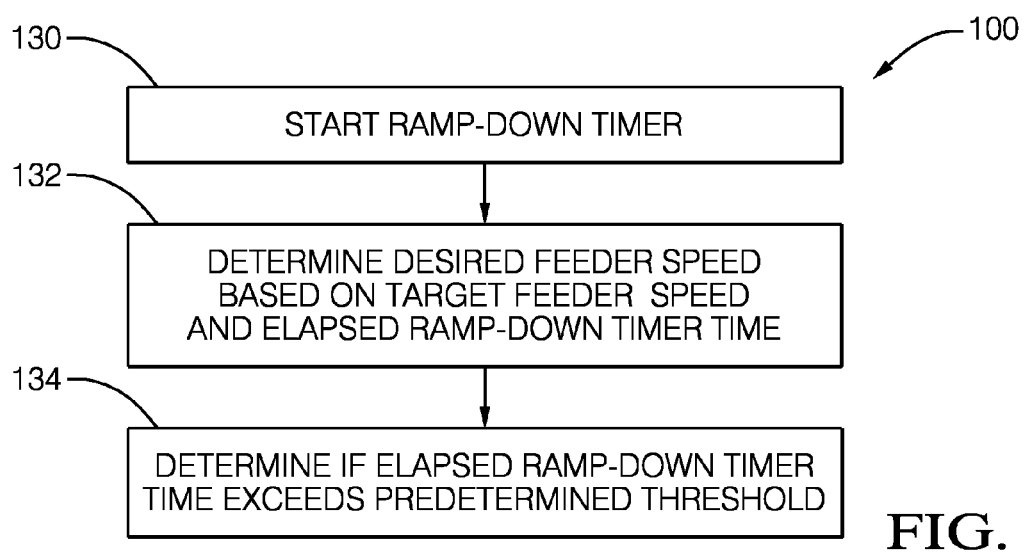
FIG. 4 is a flow chart of additional steps of the method of FIG. 2 for operating the apparatus during a shut-down phase according to another embodiment.

FIG. 4 illustrates additional optional steps of the method 100 during a shut-down phase that includes the time period between a moment when the feeder speed and the line speed are at the desired values and a later moment when the apparatus comes to a stop. The start-up phase and the shut-down phase may be referred to generically as a transition phase. The following STEPS 130-134, if executed, occur subsequent to STEP 114.

STEP 130, START A RAMP-DOWN TIMER, includes starting a ramp-down timer, via the central processing unit 38 that times the progression of the shut-down phase.

STEP 132, DETERMINE DESIRED FEEDER SPEED BASED ON TARGET FEEDER SPEED AND ELAPSED RAMP-DOWN TIMER TIME, includes determining the desired feeder speed based on the target feeder speed at which the feeder operates during steady state operation, the elapsed ramp-down timer time, and the total time for the ramp-down phase (ramp-down period time). The desired feeder speed may be determined by the formula: $DFs=TFs \times (RDt-Et/RDt)$ where DFs is the desired feeder speed, TFs is the target feeder speed, Et is the elapsed ramp-down timer time, and RDt is the ramp-down period time. STEP 132 follows STEP 130.

STEP 128, DETERMINE IF ELAPSED RAMP-DOWN TIMER TIME EXCEEDS PREDETERMINED THRESHOLD, includes determining if the elapsed ramp-down timer time exceeds a predetermined threshold that is equal to the ramp-down period time. If the elapsed ramp-down timer time does not exceed the ramp-down period time, the method returns to STEP 130. If the elapsed ramp-down timer time exceeds the ramp-down period time, the method ends.

Accordingly an apparatus 10 for forming a sheath over an elongate member and a method 100 of operating an apparatus 10 configured to form a sheath over an elongate member are provided. The apparatus 10 and method 100 provide the benefits of providing a significant reduction of insulated wire cable having an insulation layer thickness that is out of specification (scrap cable) through the start-up phase and steady state operation of the extruding machine 10, thus reducing scrap cable production. The inventors have observed reduction of scrap cable during the start-up phase from about 50 meters prior to the implementation of this invention to about 5 meters after the implementation in extruding machine embodying this invention. The apparatus 10 and method 100 also provides valuable process monitoring feedback. When the material factor is set to the correct value, the correction factor remain within a predetermined range, typically very close to unity. Deviations of the correction factor value from the predetermined range are indications that the process is out of specification which may be caused, for example, by material viscosity changes or mechanical feeder screw wear.

While this invention has been described in terms of the preferred embodiments thereof, it is not intended to be so limited, but rather only to the extent set forth in the claims that follow. The preferred embodiments presented herein illustrate an extruder 12 configured to apply an insulative coating to a wire cable 14. However, other embodiments of the invention may be envisioned wherein an extruder applies a material to an elongate body having a different shape than a wire cable. For example, a protective or decorative plastic coating may be applied to a beam or a thin sheet. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An apparatus for forming a sheath over an elongate member, comprising:
   an extruder configured to apply a material to form the sheath, the extruder further comprising a feeder operating at a feeder speed to supply the material to the extruder;
   a drive mechanism configured to move the elongate member through the extruder at a line speed to apply the material to the elongate member thus forming the sheath, wherein the sheath has a thickness;
   a thickness sensor configured to determine the thickness of the material applied to the elongate member; and
   a controller comprising a central processing unit, a memory, and a transceiver that communicates with the feeder, the extruder, and the thickness sensor and receives feeder speed data from the extruder, line speed data from the drive mechanism, and thickness data from the thickness sensor, wherein during a ramp up timer period (RUt), the central processing unit is programmed to:
   determine a desired feeder speed (DFs) based on a target feeder speed (TFs) at which the feeder operates during steady state operation and elapsed ramp-up timer time (Et), wherein the desired feeder speed is determined by the formula $DFs=TFs \times (Et/RUt)$,
   determine if elapsed ramp-up timer time exceeds a predetermined threshold, and
   adjust the line speed, via the drive mechanism, based on factors consisting of feeder speed data and a material factor value stored in the memory that is based on rheological properties of the material.

2. The apparatus according to claim 1, wherein the sheath is formed of an electrically insulative material.

3. The apparatus according to claim 1, wherein the material is a polymeric material.

4. The apparatus according to claim 1, wherein the elongate member is formed of an electrically conductive wire cable.

5. The apparatus according to claim 1, further comprising a feeder speed sensor in communication with the transceiver and configured to determine the feeder speed data.

\* \* \* \* \*